(12) United States Patent
Zheng et al.

(10) Patent No.: US 11,115,308 B2
(45) Date of Patent: Sep. 7, 2021

(54) SYSTEM AND METHOD FOR CONGESTION CONTROL USING TIME DIFFERENCE CONGESTION NOTIFICATION

(71) Applicant: Alibaba Group Holding Limited, Grand Cayman (KY)

(72) Inventors: Jun Zheng, Milpitas, CA (US); Hua Sun, San Jose, CA (US)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 16/736,437

(22) Filed: Jan. 7, 2020

(65) Prior Publication Data

US 2021/0211368 A1   Jul. 8, 2021

(51) Int. Cl.
| | | |
|---|---|---|
| *H04L 12/26* | (2006.01) | |
| *H04L 12/833* | (2013.01) | |
| *H04L 12/825* | (2013.01) | |
| *H04L 12/801* | (2013.01) | |

(52) U.S. Cl.
CPC ........ *H04L 43/106* (2013.01); *H04L 43/0882* (2013.01); *H04L 47/18* (2013.01); *H04L 47/25* (2013.01); *H04L 47/31* (2013.01)

(58) Field of Classification Search
CPC ............. H04L 43/0852; H04L 43/0858; H04L 43/087; H04L 43/106; H04L 47/11; H04L 47/18; H04L 47/25; H04L 47/283; H04L 47/31
See application file for complete search history.

(56) References Cited

U.S. PATENT DOCUMENTS

| 10,742,555 B1* | 8/2020 | Shalev ................. H04L 43/106 |
| 2016/0212032 A1* | 7/2016 | Tsuruoka .............. H04L 43/106 |
| 2017/0208485 A1* | 7/2017 | Van Der Auwera .... H04L 47/11 |

OTHER PUBLICATIONS

Zhu et al., "Congestion Control for Large-Scale RDMA Deployments", (Aug. 2015). http://dx.doi.org/10.1145/2785956.2787484.
Mittal et al., "TIMELY: RTT-based Congestion Control for the Datacenter", (Aug. 2015). http://dx.doi.org/10.1145/2785956.2787510.
Zeng et al., "Combining ECN and RTT for Datacenter Transport", (Aug. 2017). http://doi.org/10.1145/3106989.3107002.

* cited by examiner

*Primary Examiner* — Pao Sinkantarakorn
(74) *Attorney, Agent, or Firm* — Shun Yao; Park, Vaughan, Fleming & Dowler LLP.

(57) ABSTRACT

A system is provided for controlling congestion. The system sends a first data packet to a destination device, and receives a first acknowledgement packet from the destination device corresponding to the first data packet. Next, the system can extract, from the first acknowledgement packet, a first pair of timestamp values which includes a first time stamp value generated by the source device and a second timestamp value generated by the destination device, and further extract, from a second acknowledgement packet corresponding to a subsequently transmitted packet to the destination device, a second pair of time stamp values which include a third time stamp value generated by the source device and a fourth time stamp value generated by the destination device. The system can determine the congestion change by calculating a one-way travel time difference based on the first pair of timestamp values with the second pair of timestamp values.

21 Claims, 9 Drawing Sheets

Congestion control algorithm at the RP

```
1  Initialize: α, timer, C_ia, C_ih, C_d
2  Input: CN, t_currentNP, t_previousNP, t_currentRP, t_previousRP, rate_prev, N, R_step
3  if RP receives ACK then
4      UpdateAlpha(α)
5      ΔT ← (t_currentNP − t_previousNP) − (t_currentRP − t_previousRP)
6      if CN←1 then
7          if timer expires then
8              rate_new ← RateDecrease(rate_prev, α)
9              C_ia ← 0; C_ih ← 0; C_d ← 0, timer ← threshold
10         else
11             rate_new ← rate_prev
12         end
13     else if ΔT > 0 then
14         C_d ← C_d + 1, C_ia ← 0, C_ih ← 0
15         if C_d > F then
16             rate_new ← RateDecrease(rate_prev, α)
17             C_d ← 0
18         else
19             rate_new ← rate_prev
20         end
21     else if ΔT < 0 then
22         C_ia ← C_ia + 1, C_ih ← C_ih + 1, C_d ← 0
23         if C_ih > H then
24             rate_new ← HyperIncrease(rate_prev, N, R_step)
25         else if C_ia > F then
26             rate_new ← AdditiveIncrease(rate_prev, R_step)
27         else
28             rate_new ← rate_prev
29         end
30     else
31         C_ia ← 0; C_ih ← 0; C_d ← 0
32         rate_new ← rate_prev
33     end
34     rate_prev ← rate_new
35     t_previousNP ← t_currentNP
36     t_previousRP ← t_currentRP
37 end
```

FIG. 6

SYSTEM AND METHOD FOR CONGESTION CONTROL USING TIME DIFFERENCE CONGESTION NOTIFICATION

BACKGROUND

Field

This disclosure is generally related to the technical field of congestion control in computer networks. More specifically, this disclosure is related to a method and system for controlling congestion in data center networks to facilitate reliable data transmission.

Related Art

In recent years, data centers have been burdened with increasing amount of computation, storage, and communications within data center networks. Further, due to a high demand for data center applications, e.g., web applications, web services, etc., which are resource intensive and latency sensitive, modern data center networks are expected to provide high throughput and ultra-low latency with low computational overhead. When networks fail to meet these requirements, the performance of the data center applications may degrade and may result in unreliable packet delivery.

One of the reasons for such degradation is network congestion, which occurs when a network node has to deal with more data than it can handle. To avoid network congestion, several congestion control techniques have been used in the data center networks. The following paragraphs describe, some of the challenges encountered in known congestion control techniques.

Traditional transport control protocol (TCP) based congestion control techniques use packet loss as a metric for detecting network congestion. However, this technique does not meet the above-mentioned requirements, specifically, high throughput and ultra-low latency with low computational overhead. This is because TCP based network congestion control is slow in response time. In other words, TCP congestion control is triggered at the host only after a significant amount of packets have been dropped.

Another technique uses Explicit Congestion Notification (ECN) to indicate network congestion. ECN is a flag set by switches in the network to signal the presence of congestion at the switch. However, this technique is only capable of detecting the presence of congestion but is not capable of detecting the amount or extent of congestion.

Data center transport control protocol (DCTCP) congestion control technique is an improvement over traditional ECN based congestion control. DCTCP is a window-based congestion control technique. However, the implementation of this technique is complex and is located in host stacks, thereby causing high computational overhead and high-latency.

Remote Direct Memory Access (RDMA) over Converged Ethernet (RoCEv2) technique is capable of meeting the demands placed on modern data centers by ensuring a drop-free network. However, it is complicated and incurs high maintenance cost.

Data Center Quantized Congestion Notification (DCQCN) is a lightweight rate-based congestion control technique. The DCQCN technique uses three-point architecture. Specifically, a sender or a reaction point (RP), a switch or a congestion point (CP), and a receiver or a notification point (NP). Whenever congestion is detected at a switch, e.g., when a queue length exceeds a threshold, the switch sets an ECN flag in the arriving packets. At the NP, when the setting of the ECN flag is detected, the NP conveys the congestion information by sending congestion notification packets (CNP) back to the sender or RP. At the RP, upon receiving the CNP the rate at which packets are sent towards the NP is adjusted.

However, the performance of the DCQCN technique deteriorates when the size of the data center network increases. For example, the deterioration in performance can be due to longer round-trip time (RTT) associated with the congestion notification. Furthermore, the DCQCN technique converges slowly to a target rate due to its inability to estimate the extent of congestion in the network and its use of fixed timing adjustment. Therefore, with the increasing size of the data center networks and the large amount of data traffic flowing through the switches, DCQCN techniques provide a less effective congestion control.

RTT-based congestion control technique, e.g., Transport Informed by MEasurement of LatencY (TIMELY), uses RTT as a measure of a delay associated with a packet. The RTT value provides information about an amount of congestion in the network. Based on the RTT value the sender performs congestion control by either increasing or decreasing the sending rate of packets. Since performance of this technique solely depends on the measured RTT value, accurate measurement of RTT value can become important. However, due to noise introduced into the acknowledgement messages in the reverse path, the measured RTT value can become inaccurate or distorted. Therefore, although this technique is capable of indicating the amount of congestion in the network, it suffers the drawback that the RTT values can be inaccurate.

Due to the above-mentioned drawbacks associated with different congestion control techniques, some challenges still remain in designing an effective congestion control technique that is capable of providing high throughput and ultra-low latency with low computational overhead.

SUMMARY

According to one embodiment of the present disclosure, a system for controlling congestion in a computer network is provided. During operation, the system can send a first data packet to a destination device. The system may receive a first acknowledgement packet from the destination device corresponding to the first data packet. Next the system can extract, from the first acknowledgement packet, a first pair of timestamp values which includes a first time stamp value generated by the source device and a second timestamp value generated by the destination device. The system can further extract, from a second acknowledgement packet corresponding to a subsequently transmitted packet to the destination device, a second pair of time stamp values which include a third time stamp value generated by the source device and a fourth time stamp value generated by the destination device. The system can then determine a degree of congestion by calculating a one-way travel time difference based on the first pair of timestamp values and the second pair of timestamp values. The system can then perform congestion control based on the degree of congestion.

In a variation on this embodiment, the system may append the first timestamp to the first data packet prior to sending the first data packet towards the destination device. The first timestamp indicates a time at which the system transmits the first data packet.

In a further variation on this embodiment, the system can include the first timestamp and the second timestamp in the first acknowledgement packet prior to sending the first acknowledgement packet. The second timestamp corresponds to a time at which the destination device transmits the first acknowledgement packet.

In a further variation on this embodiment, the system may control congestion in a network by performing the following operations. First, in response to the system determining that the degree of congestion is low, the system can: increment a counter value, e.g., counter Ci; increase a packet transmission rate at the source device when the counter value Ci is above threshold H; and increase a packet transmission rate at the source device when the first counter value is below the threshold H and above threshold F.

In a variation on this embodiment, the system may control congestion in a network by performing the following operations. First, in response to determining that the degree of congestion is high the system can increment a counter value, e.g., Cd. The system can then decrease a packet transmission rate at the source device when the counter value Cd exceeds a threshold F. Next the system can decrease a packet transmission rate at the source device when a timer at the source device has expired.

In a variation on this embodiment, the system may send the first data packet towards the destination device via a unidirectional protocol.

In a variation on this embodiment, the system may store the first pair of timestamp values and the second pair of timestamp values at the source device.

In a further variation on this embodiment, the first timestamp and the third timestamp can be hardware generated at the source device.

In a further variation on this embodiment, the second timestamp and the fourth timestamp can be hardware generated at the destination device.

BRIEF DESCRIPTION OF THE FIGURES

FIG. 6 shows a pseudocode for adjusting a data transmission rate at a source device, according to one embodiment of the present disclosure.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the principles and features disclosed herein.

Overview

Numerous congestion control techniques have been developed and applied to high performance data center networks. These congestion control techniques are expected to improve the performance of the data center networks by providing high throughput and low latency. However, due to a number of drawbacks associated with traditional and known congestion control techniques, the expected performance level of the data center networks is not achieved.

The embodiments described herein provide a system and method that is capable of performing network congestion control in data center networks and providing high-throughput and low latency. The system may consider a three-point architecture: reaction point (RP), a congestion point (CP), and a notification point (NP), for applying the congestion control technique. The NP may receive an ECN from a switch or a CP in the data center network. In response to receiving the ECN, the NP may send an acknowledgement message back to the sender or RP by including a congestion notification, a timestamp associated with the RP, and a timestamp associated with the NP. These timestamps can be used by the RP to calculate a one-way travel time difference. Upon receiving the acknowledgement message, the RP may start performing rate adjustment based on the CN bit and the one-way travel time difference. Such a network congestion control technique that combines a precise one-way travel time difference metric and CN provides a better rate control and fast convergence.

The congestion control technique described herein is represented by the term: Time Difference Congestion Notification (TDCN). In one embodiment of the present disclosure, the system applying the TDCN congestion control technique is capable of functioning over lossless, L3 routed, user datagram protocol (UDP) encapsulated data center networks. Further, TDCN enabled system is capable of lowering computational overhead and guarantees reliable data transmission. In addition, the TDCN enabled system is capable of: providing quick start; providing fast convergence while performing bandwidth allocation; maintaining low queue length; and guaranteeing high link utilization.

System Architecture

Figure 1:
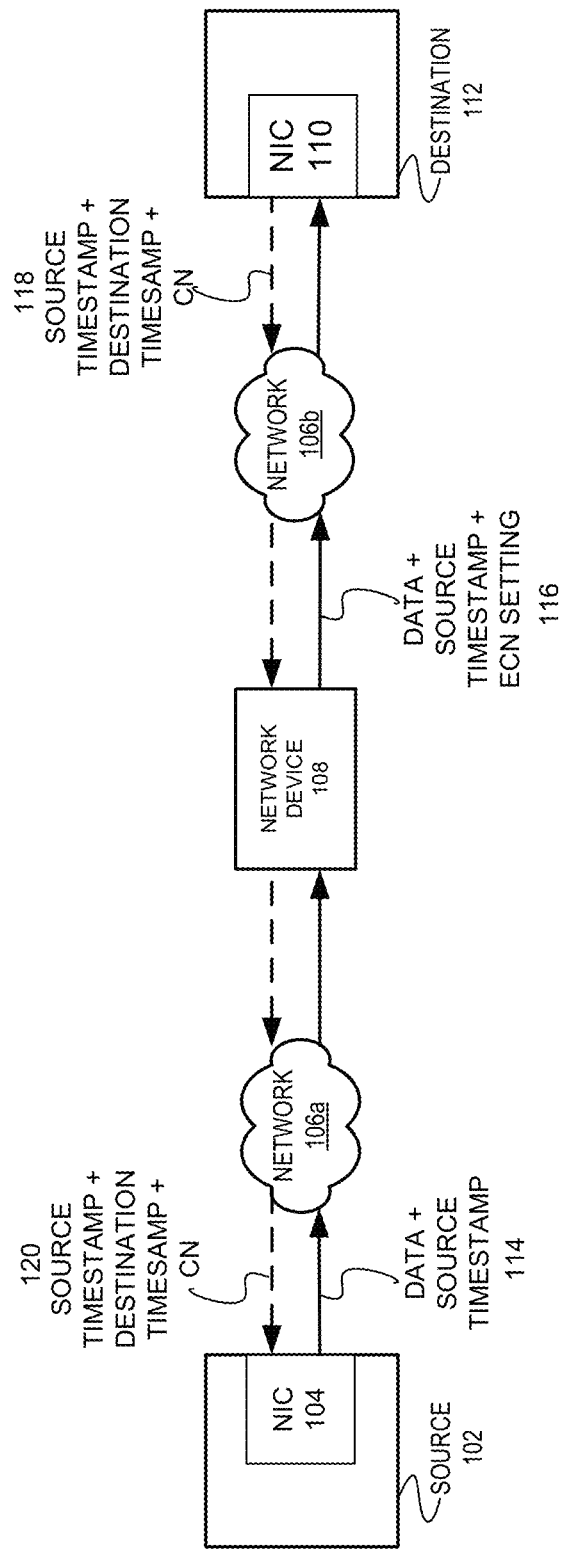
FIG. 1 shows an exemplary environment and communication for performing congestion control in data center networks, according to one embodiment of the present disclosure.

FIG. 1 shows an exemplary environment and communication for performing congestion control in data center networks, according to one embodiment of the present disclosure. Environment 100 can include a source device 102, e.g., a sender or a reaction point (RP), a destination device 112, e.g., a receiver or a notification point (NP), networks 106a and 106b, and a network device 108, e.g., a switch. In the embodiments described herein the following terms would be used interchangeably: "source device" or "reaction point" or "RP"; "network device" or "congestion point" or "CP"; "destination device" or "notification point" or "NP."

Environment 100 shows a compact representation of communication between source device 102 and destination device 112 via the data center network. The data center network can include a large number of interconnected network devices. Network 106a and network 106b represent different portions of the same data center network. Environment 100 shows one network device 108 from the plurality of interconnected network devices in the data center network.

Source device 102 may send a plurality of data packets via a plurality of network devices towards destination device 112. As part of the congestion control mechanism, a component in source device 102, e.g., a network interface card (NIC) 104, may append a hardware generated timestamp to each data packet or payload before sending the data packet 114 towards destination device 112. For example, prior to sending a data packet, source device 102 may instantly record a time $t_1$ based on a time at source device 102. In one embodiment of the present disclosure, the system may use a unidirectional network protocol such as UDP to transmit the data packets towards destination device 112 via one or more network devices in a data center network. Source device 102 further appends a 5-tuple header to the data packet. For example, the 5-tuple can include the following fields: destination Internet Protocol (IP) address field, source IP address field, destination port number, source port number, and a protocol field. This 5-tuple can be used as a flow identifier for the data packets.

Network congestion may occur at one or more network devices in the data center network. For example, in a highly utilized network, congestion may occur at multiple switches. Assume that congestion occurs at network device 108 when an amount of packets arriving at network device 108 causes the queue length to exceed a threshold. Network device 108 may detect onset of such congestion, and instead of dropping the data packets when a queue length associated with network device 108 exceeds a specific threshold, network device 108 may set two bits corresponding to an Explicit Congestion Notification (ECN) field in the IP header to 1. The ECN field in the IP header of the data packet has two bits: an ECN capable Transport bit (ECT) and Congestion Experienced (CE) bit. Both the ECT and CE bits are set to 1 when network device 108 experiences congestion.

Network device 108 can then forward packet 116 including the timestamp inserted at source device 102 and the ECN setting toward destination device 112 via network 106b. Upon receiving packet 116, destination device 112 may instantly record a time $t_2$ based on a hardware generated time at destination device 112. Destination device 112 may then generate an acknowledgement based on information in packet 116. Specifically, destination device 112 may include the following fields in an acknowledgement packet 118: a timestamp $t_2$ generated by hardware at destination device 112, timestamp $t_1$ received from source device 102, and a congestion notification based on the ECN setting in packet 116. Destination device 112 may send acknowledgement packet 118 towards source device 102 via the data center network, e.g., via 106b, 108, and 106b. At source device 102, timestamps $t_1$, $t_2$, and congestion notification values are extracted from acknowledgement packet 120 and stored at source device 102.

For a next data packet sent by source device 102 associated with the same flow identifier, environment 100 may repeat the above-described steps to obtain a second pair of timestamp values, e.g., timestamps $t_3$ and $t_4$, and a congestion notification. A process of obtaining and using the timestamps $t_1$, $t_2$, $t_3$ and $t_4$ is further explained in FIG. 2 and FIGS. 3A-3B. Source device 102 may then calculate a one-way travel time difference for the two consecutive data packets as follows:

$$\Delta t_{NP}=(t_4-t_2) \quad (1)$$

$$\Delta t_{RP}=(t_3-t_1) \quad (2)$$

$$\Delta T=\Delta t_{NP}-\Delta t_{RP} \quad (3)$$

where $\Delta t_{NP}$ denotes a time difference of two consecutive packets on NP (destination device 112); $\Delta t_{RP}$ denotes a time difference of two consecutive packets on RP (source device 102); and $\Delta T$ denotes a one-way travel time difference for two consecutive data packets in the data center network. Environment 100 may then use the one-way travel time difference $\Delta T$ for two consecutive data packets in the data center network and congestion notification settings in the two consecutive acknowledgement packets (corresponding to the two consecutive data packets) to compute a degree of congestions and to control network congestion based on this degree of congestion.

One of the major drawbacks of RTT based congestion control mechanism is that the travel time for an acknowledgement in the reverse path from NP to the RP is used for determining whether the network is experiencing more or less congestion. But since the travel time in the reverse path is unreliable and subject to noise, RTT values become inaccurate. Since precise RTT measurement is crucial to performing congestion control, using inaccurate RTT values would result in a degradation of the network throughput.

In contrast to RTT based congestion control mechanism, the system in the present disclosure is capable of eliminating the effect of changes in acknowledgement travel time on the reverse path from NP to the RP by only using one-way travel time based on the hardware timestamps at the end devices, i.e., the source device (RP) and the destination device (NP).

Figure 2:
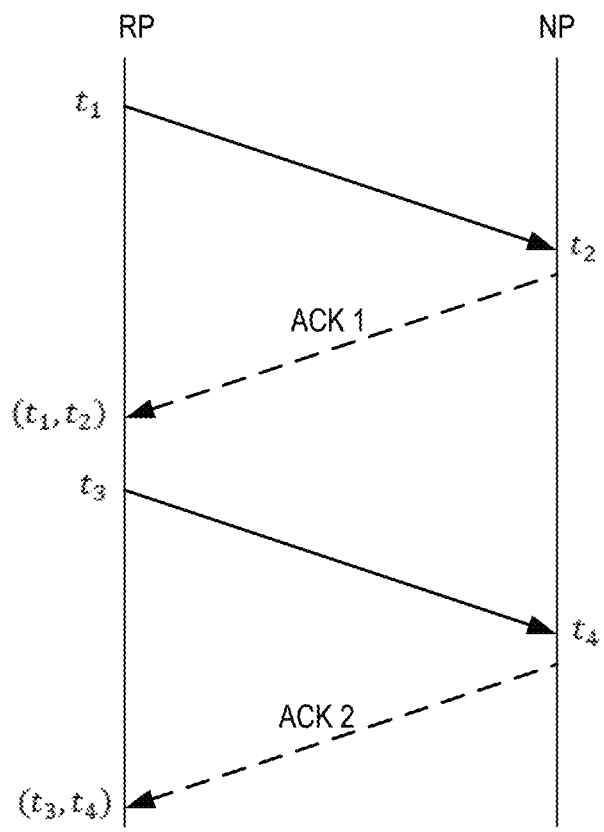
FIG. 2 shows an exemplary diagram illustrating how different timestamps are communicated between two end-devices, in accordance with an embodiment of the present disclosure.

FIG. 2 shows an exemplary diagram illustrating how different timestamps are communicated between two end-devices, in accordance with an embodiment of the present disclosure. Specifically, FIG. 2 depicts that one of the embodiments can cause a system to send a first data packet associated with a specific flow at time instant $t_1$. Time $t_1$ denotes a time in the RP, i.e., a hardware generated time at the RP. The system may include time $t_1$ in the first data packet. The first data packet is received at the NP at time $t_2$, where $t_2$ represents a time at the NP, i.e., time generated by hardware in the NP. Note that the first data packet reaches the NP after a certain delay. In one embodiment, the time at the RP and the NP may not be synchronized.

In response to receiving the first data packet at NP, the system may enable the NP to generate an acknowledge ACK 1 including the times $t_1$ and $t_2$. In the reverse path from the NP to the RP, ACK 1 packet also encounters a certain delay. When RP receives ACK 1, times $t_1$ and $t_2$ are persisted at the RP. For a subsequent data packet sent by the RP, the RP and NP may respectively record times $t_3$ and $t_4$. Specifically, the RP may record time $t_3$ when RP sends a second data packet towards the NP. The system may propagate a value of time $t_3$ along with the second data packet towards the NP. Again, at the NP, the NP may record a time $t_4$ indicating a time when it receives the second data packet. The NP can then include the times $t_3$ and $t_4$ in ACK 2 and send ACK 2 to the RP. Upon receiving ACK 2, RP stores the values of $t_3$ and $t_4$. These time value pairs $(t_1, t_2)$ and $(t_3, t_4)$ are used for calculating the one-way time difference according to equations (1)-(3).

Figure 3C:
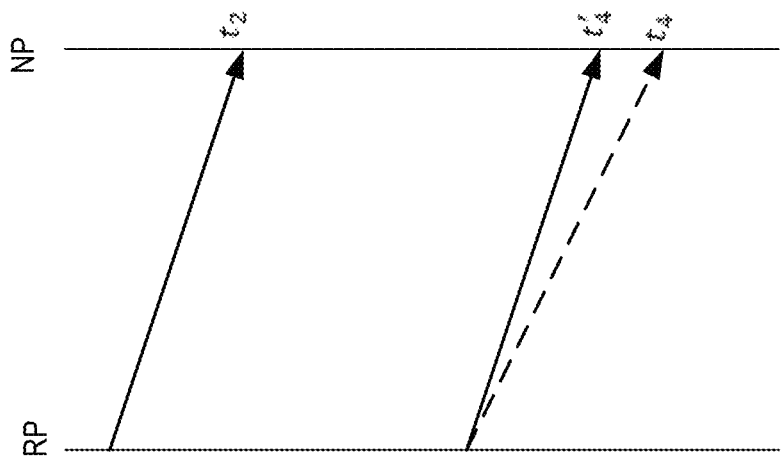
FIG. 3C presents an exemplary diagram illustrating a decrease in the one-way travel time, in accordance with an embodiment of the present disclosure.
Figure 3B:
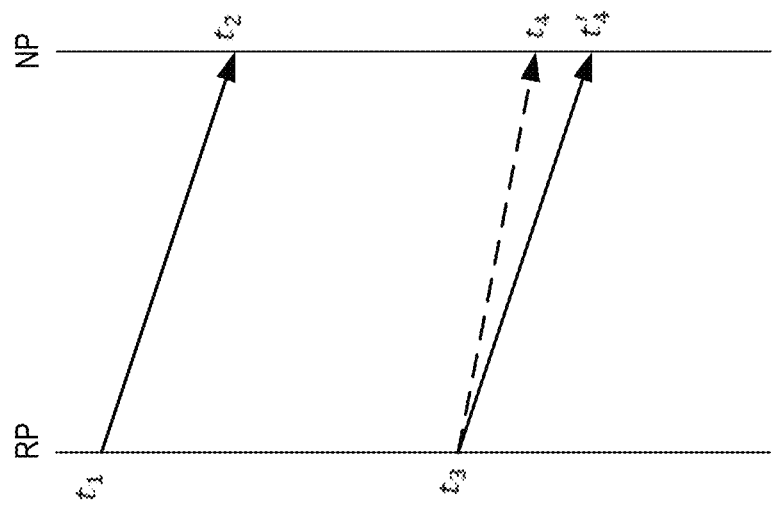
FIG. 3B presents an exemplary diagram illustrating an increase in the one-way travel time, in accordance with an embodiment of the present disclosure.
Figure 3A:
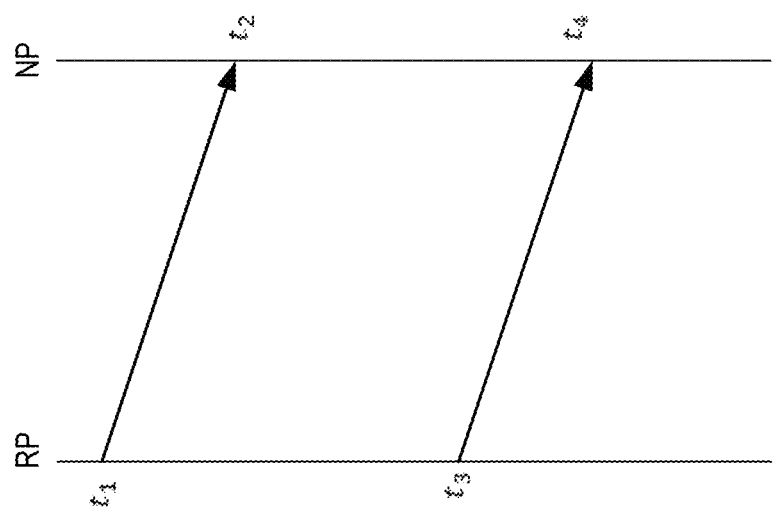
FIG. 3A presents an exemplary diagram illustrating no change in the one-way travel time, in accordance with an embodiment of the present disclosure.

FIG. 3A presents an exemplary diagram illustrating no change in the one-way travel time, in accordance with an embodiment of the present disclosure. In other words, the one-way travel time from RP to NP for the first data packet and the second data packet can be the same. Note that the first data packet and the second data packet are associated with the same flow identifier. Specifically, $$\Delta t_{NP} = (t_4 - t_2) = \Delta t_{RP} = (t_3 - t_1) \quad (4)$$

$$\Delta T = \Delta t_{NP} - \Delta t_{RP} = 0 \quad (5)$$

When $\Delta T = 0$ it indicates that there has been no change in the degree of congestion in the data center network and hence the RP does not need to take any action to adjust the transmission rate of subsequent data packets associated with the same flow identifier.

FIG. 3B presents an exemplary diagram illustrating an increase in one-way travel, in accordance with an embodiment of the present disclosure. FIG. 3B shows that a one-way travel time for the second data packet is longer than the one-way travel time for the first data packet. Specifically, $$\Delta t_{NP} = (t'_4 - t_2) \quad (6)$$

$$\Delta t_{RP} = (t_3 - t_1) \quad (7)$$

$$\Delta t_{NP} > \Delta t_{RP} \quad (8)$$

$$\Delta T = \Delta t_{NP} - \Delta t_{RP} > 0 \quad (9)$$

When $\Delta T > 0$ it indicates that there has been congestion on a forward path from the RP to the NP for data packets associated with a specific flow identifier. Therefore, the RP may have to perform a congestion control mechanism by, for example, reducing the rate of packet transmission for data packets associated with the specific flow identifier.

FIG. 3C presents an exemplary diagram illustrating a decrease in the one-way travel time, in accordance with an embodiment of the present disclosure. FIG. 3C shows that a one-way travel time for the second data packet is shorter than the one-way travel time for the first data packet. Specifically, $$\Delta t_{NP} = (t'_4 - t_2) \quad (10)$$

$$\Delta t_{RP} = (t_3 - t_1) \quad (11)$$

$$\Delta t_{NP} < \Delta t_{RP} \quad (12)$$

$$\Delta T = \Delta t_{NP} - \Delta t_{RP} < 0 \quad (13)$$

When $\Delta T < 0$ it indicates that the degree of congestion in the forward path from the RP to the NP is eased and can accommodate more traffic. Therefore, the RP may perform a congestion control mechanism by, for example, increasing the rate of packet transmission for data packets associated with the specific flow identifier.

Based on the above description of FIGS. 3A-3B, it is apparent that although the time values or timestamps on different devices are not synchronized, the system is capable of precisely determining whether the one-way travel time from the RP to the NP is decreasing or increasing. In addition, the system can use the end-to-end timestamps to precisely determine whether the forward path from the RP to the NP is experiencing more or less congestion.

Figure 4:
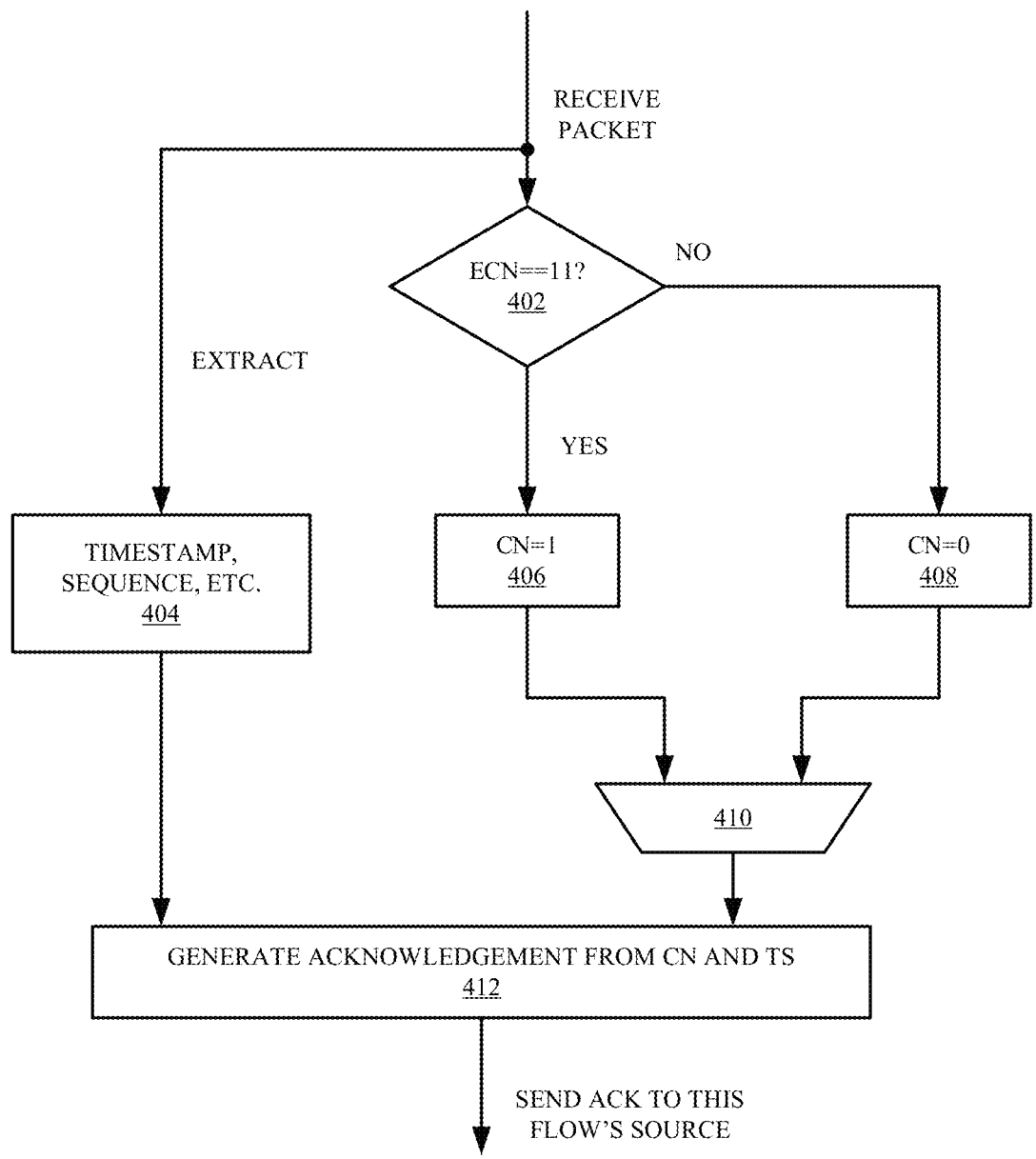
FIG. 4 presents a flowchart illustrating an exemplary process for generating an acknowledgement at a destination device, according to one embodiment of the present disclosure.

In the following paragraph, a process for generating an acknowledgement message at the NP or the destination device is discussed. FIG. 4 presents a flowchart illustrating an exemplary process for generating an acknowledgement at a destination device, according to one embodiment of the present disclosure. When the destination device receives a (IP) packet from the source device, it may detect whether an ECN flag in the (IP) packet has been marked with bits "11" (operation 402). In response to the destination device determining that the ECN flag has been set to "11", the destination device may set a congestion notification (CN) flag to "1" to indicate that network congestion has occurred (operation 406), otherwise the CN flag is set to "0" to indicate that no network congestion has occurred (operation 408).

Further, the destination device may extract the source device timestamp from the received packet (operation 404). The destination device may select the CN setting (operation 410) and combine the CN with the extracted timestamp to form or generate an acknowledgement packet (operation 412). The destination device may then send the generated acknowledgement packet towards the source device from which the data packets associated with a specific flow was received by the destination device.

Figure 5:
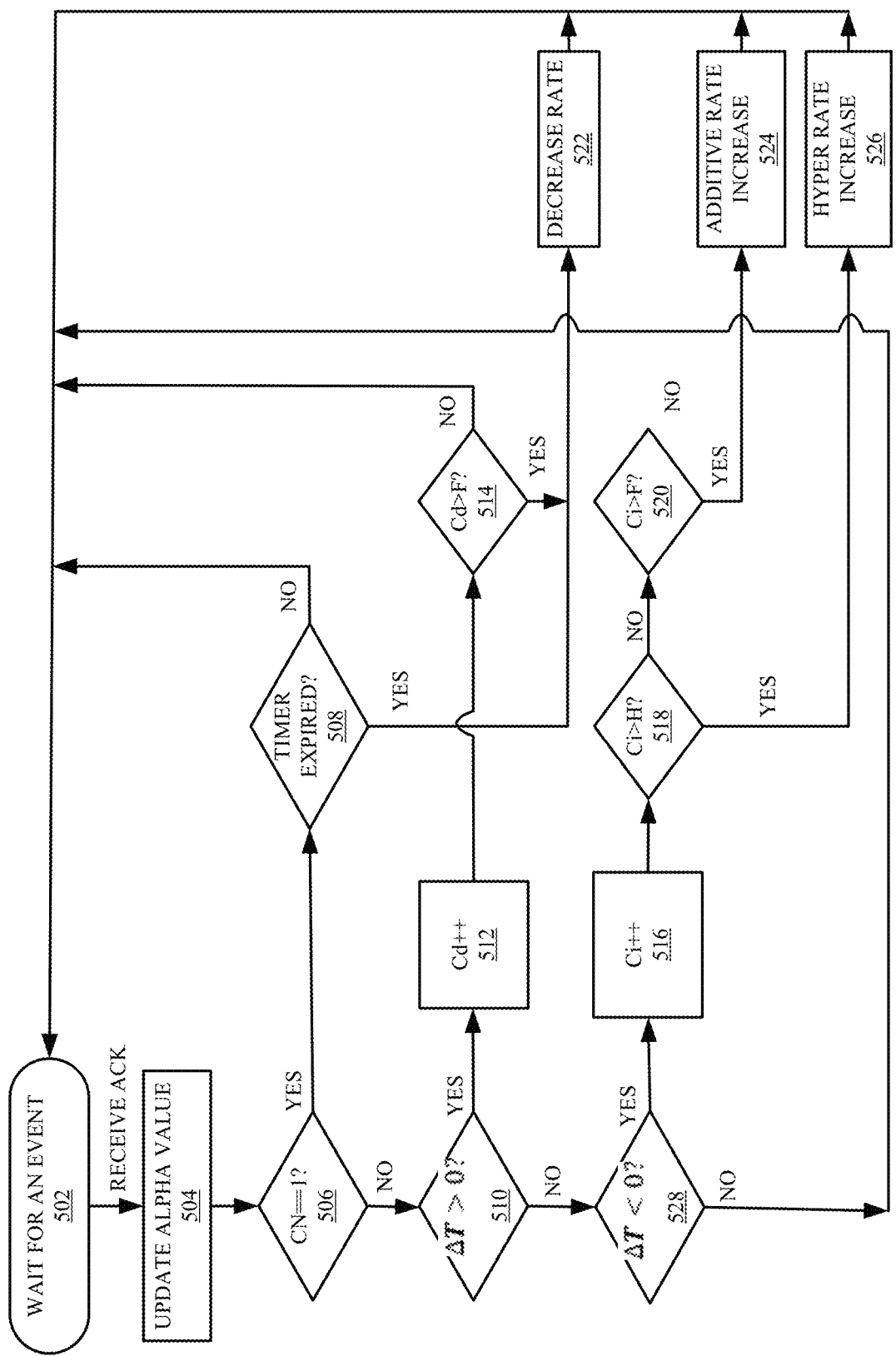
FIG. 5 presents a flowchart illustrating an exemplary process for adjusting a data transmission rate at a source device, according to one embodiment of the present disclosure.

FIG. 5 presents a flowchart illustrating an exemplary algorithm for adjusting a data transmission rate at a source device, according to one embodiment of the present disclosure. A system in the source device may wait for an acknowledgement from the destination device (operation 502) in response to sending the data packets associated with a specific flow identifier to the destination device. The system upon receiving the acknowledgment including the CN and timestamp values, may update an alpha value based on the received CN value (operation 504). The system may later use the alpha value for adjusting a transmission rate.

Next, the system may determine if CN is set to "1" and if CN is set to "1" then the system may determine if a timer has expired (operations 506 and 508). The system may check if CN is set to "1" in the subsequent acknowledgements packets for a specific length of time. In other words, the system may use the timer to guard against false positives and unnecessary rate adjustment for every acknowledgement received. When the timer expires, the system may decrease a packet transmission rate associated with the flow identifier to reduce congestion in the network (operation 522).

When the system detects that CN is set to "0", then the system may apply the novel TDCN congestion control mechanism. Specifically, the system may determine if a time difference (calculated according to equations (1)-(3)) is greater that zero (operation 510). A time difference value greater than zero indicates that the network may be congested. In this case, the system may reduce the transmission rate after the condition in 510 is satisfied for a threshold number of times, i.e., counter Cd is greater than a threshold F (operation 512 and 514). The system may use such a threshold to prevent occurrence of false positives and to prevent unnecessary triggering of the rate reduction process.

When the system detects that the time difference is less than "0" (operation 528), a counter, Ci, is incremented by 1 (operation 516). When the system does not satisfy the condition in 518, i.e., the counter Ci is not greater than threshold H, but greater than threshold F (operation 520), then the system may apply a slow step-wise increase of the transmission rate to a target rate. Note that threshold H is greater than threshold F. When the system satisfies the condition in 518, i.e., the counter Ci is greater than threshold H, (operation 518) then the system may rapidly increase the transmission rate to a target rate (operation 526). Note that during the process of determining whether the time difference, $\Delta T<0$ or $\Delta T>0$ or $\Delta T==0$, the system may ignore a few low bits to accommodate clock jitter.

FIG. 6 shows a pseudocode for adjusting a data transmission rate at a source device, according to one embodiment of the present disclosure. In one embodiment of the present disclosure, the different calculation steps illustrated in FIG. 6 can be implemented in hardware to have a timely rate adjustment and to simplify the design of congestion control technique.

Figure 7:
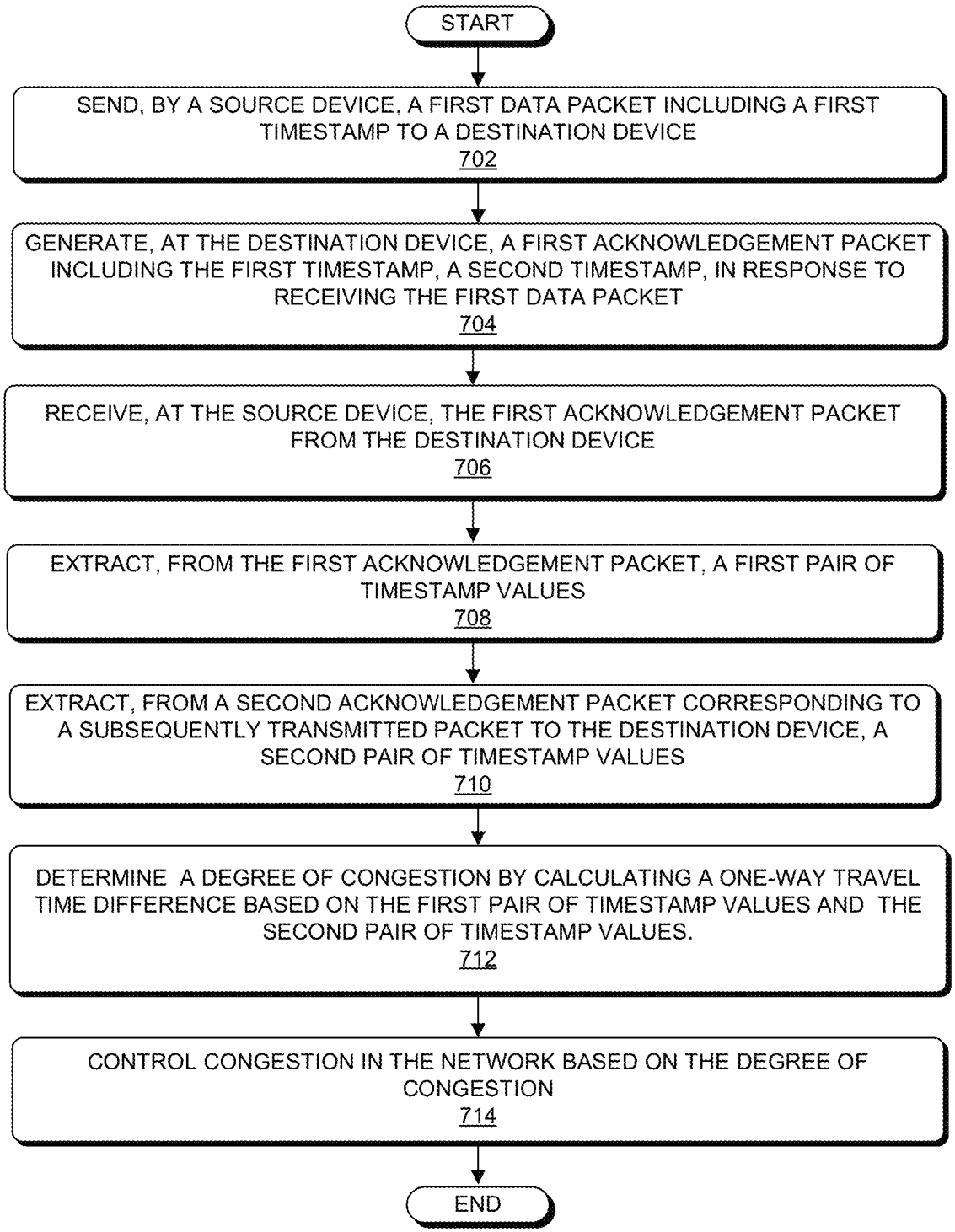
FIG. 7 presents a flowchart illustrating an exemplary process for performing congestion control in a data center network, according to one embodiment of the present disclosure.

FIG. 7 presents a flowchart illustrating an exemplary process for controlling congestion in a data center network, in accordance with an embodiment of the present disclosure. During operation, the system at the source device can send a first data packet including a first timestamp towards the destination device via a plurality of network devices in the network (operation 702). The destination device may receive the first data packet including the first timestamp. In response to receiving the first data packet, the destination device may generate a first acknowledgement packet by including the first timestamp, a second timestamp, and a first congestion notification (operation 704). FIG. 4 provides an explanation on how the destination device generates an acknowledgement packet.

The destination device may then send the generated first acknowledgement packet towards the source device. The source device may receive the first acknowledgement packet from the destination device (operation 706). The system can extract, from the first acknowledgement packet, a first pair of timestamp values (operation 708). The first pair of timestamp values includes a first time stamp value generated by the source device and a second timestamp value generated by the destination device. Next, the system can extract, from a second acknowledgement packet corresponding to a subsequently transmitted packet to the destination device, a second pair of time stamp values (operation 710). The second pair of timestamp values includes a third time stamp value generated by the source device and a fourth time stamp value generated by the destination device. The system can then determine a degree of congestion by calculating a one-way travel time difference based on the first pair of timestamp values and a second pair of timestamp values (operation 712). Note that all the timestamp values are hardware generated at the end devices, e.g., at the source device and/or at the destination device. The system can then perform congestion control based on the degree of congestion (operation 714). For example, the system may use the degree of congestion to decrease a transmission rate of data packets, or rapidly increase the transmission rate, or incrementally increase the transmission rate.

Exemplary Computer System and Apparatus

Figure 8:
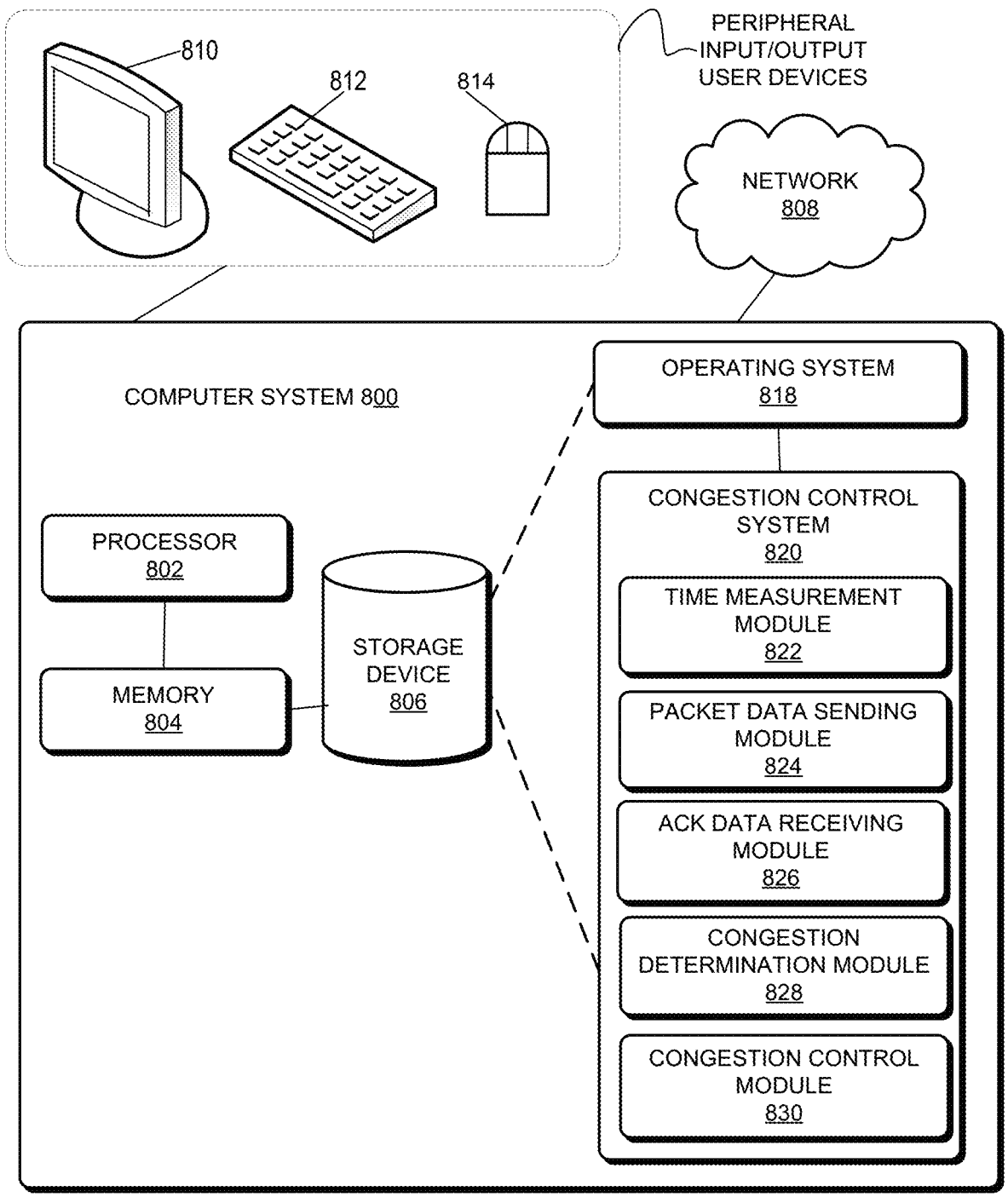
FIG. 8 illustrates an exemplary computer system that facilitates congestion control in a data center network, according to one embodiment of the present disclosure.

FIG. 8 illustrates an exemplary computer system that facilitates congestion control in a data center network, according to one embodiment of the present disclosure. Computer system 800 includes a processor 802, a memory 804, and a storage device 806. Computer system 800 can be coupled to a plurality of peripheral input/output devices, e.g., a display device 810, a keyboard 812, and a pointing device 814, and can also be coupled via one or more network interfaces to network 808. Storage device 806 can store an operating system 818 and a congestion control system 820.

In one embodiment, congestion control system 820 can include instructions, which when executed by processor 802 can cause computer system 800 to perform methods and/or processes described in this disclosure. During operation of computer system 800, congestion control system 820 can include instructions for recording a hardware generated time (time measurement module 822) at an instant of sending data packets towards a destination device (packet data sending module 824). Congestion control system 820 may further include instructions for receiving an acknowledgement packet from the destination device (ACK data receiving module 826). In response to receiving the acknowledgement packet, congestion control system 818 may use information in the acknowledgement packet to determine a presence of network congestion and the amount of network congestion (congestion determination module 828). Congestion control system 818 may be further configured to adjust a transmission rate based on a level of congestion determined in congestion determination module 828 (congestion control module 830). In some embodiments, modules 822-830 can be partially or entirely implemented in hardware and can be part of the processor 802.

Figure 9:
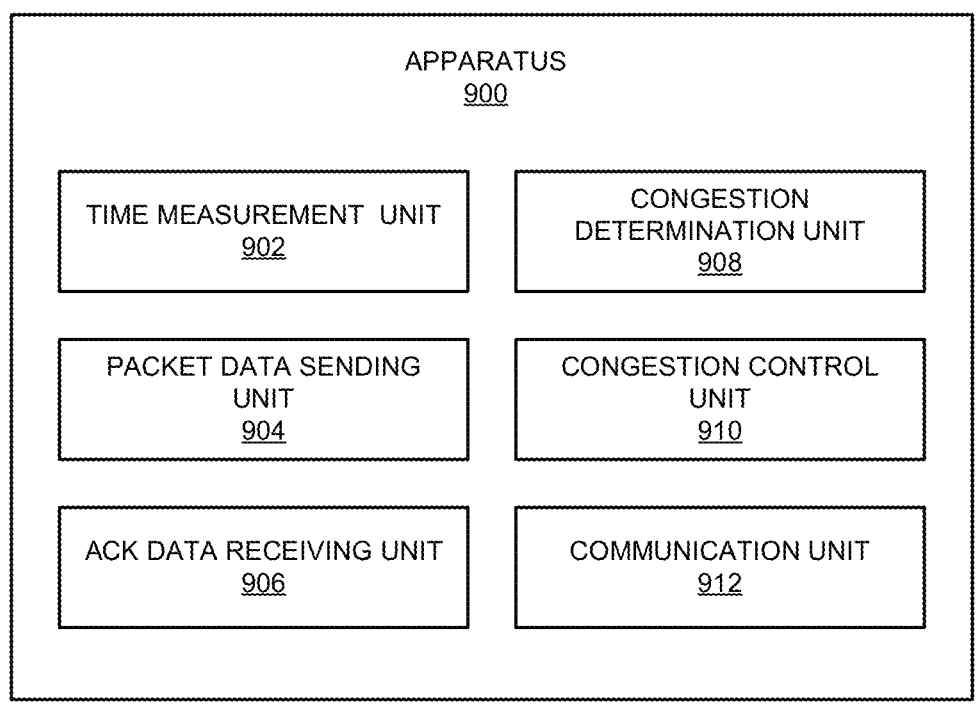
FIG. 9 illustrates an exemplary apparatus that facilitates congestion control in a data center network, according to one embodiment of the present disclosure.

FIG. 9 illustrates an exemplary apparatus that illustrates an exemplary apparatus that facilitates congestion control in a data center network, according to one embodiment of the present disclosure. Apparatus 900 can comprise a plurality of units or apparatuses that may communicate with one another via a wired, wireless, quantum light, or electrical communication channel. Apparatus 900 may be realized using one or more integrated circuits, and may include fewer or more units or apparatuses than those shown in FIG. 9. Further, apparatus 900 may be integrated in a computer system, or realized as a separate device that is capable of communicating with other computer systems and/or devices. Specifically, apparatus 900 can include units 902-910, which perform functions or operations similar to modules 822-830 of computer system 800 of FIG. 8. Apparatus 900 includes: a time measurement unit 902, a packet data sending unit 904, an acknowledgement data receiving unit 906, a congestion determination unit 908, a congestion control unit 910. Apparatus 900 can further include a communication unit 912.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art. Additionally, the above disclosure is not intended to limit the present disclosure. The scope of the present disclosure is defined by the appended claims.

What is claimed is:

1. A computer-implemented method for controlling congestion in a network, the method comprising:
    sending, by a source device, a first data packet to a destination device;
    receiving, at the source device, a first acknowledgement packet from the destination device corresponding to the first data packet;
    extracting, from the first acknowledgement packet, a first pair of timestamp values which includes a first time stamp value generated by the source device when the source device sends the first data packet and a second timestamp value generated by the destination device when the destination device receives the first data packet;
    extracting, from a second acknowledgement packet corresponding to a subsequently transmitted packet to the destination device, a second pair of time stamp values which include a third time stamp value generated by the source device when the source device sends the subsequent packet and a fourth time stamp value generated by the destination device when the destination device receives the subsequent packet;
    determining a degree of congestion by:
        calculating a first difference between the first time stamp value and the third time stamp value;
        calculating a second difference between the second time stamp value and the fourth time stamp value; and
        calculating, based on the first difference and the second difference, a third difference; and
    controlling congestion in the network based on the degree of congestion.

2. The method of claim 1, further comprising:
    appending the first timestamp to the first data packet prior to sending the first data packet to the destination device, wherein the first timestamp corresponds to a time at which the source device transmits the first data packet.

3. The method of claim 1, further comprising:
    including the first timestamp and the second timestamp in the first acknowledgement packet prior to sending the first acknowledgement packet.

4. The method of claim 1, wherein controlling congestion in the network based on the degree of congestion comprises:
    in response to determining that the degree of congestion is low:
        incrementing a counter value Ci;
        increasing a packet transmission rate at the source device when the counter value Ci is above a threshold H; and
        increasing a packet transmission rate at the source device when the counter value Ci is below the threshold H and above a threshold F.

5. The method of claim 1, wherein controlling congestion in the network based on the degree of congestion further comprises:
    in response to determining that the degree of congestion is high:
        incrementing a counter value Cd;
        decreasing a packet transmission rate at the source device when the counter value Cd exceeds a threshold F; and
        decreasing a packet transmission rate at the source device when a timer at the source device has expired.

6. The method of claim 1, wherein the source device sends data packets towards the destination device via a unidirectional protocol.

7. The method of claim 1, wherein the first pair of timestamp values and the second pair of timestamp values are stored at the source device.

8. The method of claim 1, wherein the first timestamp and the third timestamp are hardware generated at the source device.

9. The method of claim 1, wherein the second timestamp and the fourth timestamp are hardware generated at the destination device.

10. The method of claim 1, wherein the source device and the destination device are unsynchronized to generate the first pair of timestamp values and the second pair of timestamp values.

11. An apparatus for controlling congestion in a network, comprising:
    one or more processors; and
    a storage medium storing instructions that, when executed by the one or more processors, cause the apparatus to perform a method comprising:
        sending, by a source device, a first data packet to a destination device;
        receiving, at the source device, a first acknowledgement packet from the destination device corresponding to the first data packet;
        extracting, from the first acknowledgement packet, a first pair of timestamp values which includes a first time stamp value generated by the source device when the source device sends the first data packet and a second timestamp value generated by the destination device when the destination device receives the first data packet;
        extracting, from a second acknowledgement packet corresponding to a subsequently transmitted packet to the destination device, a second pair of time stamp values which include a third time stamp value generated by the source device when the source device sends the subsequent packet and a fourth time stamp value generated by the destination device when the destination device receives the subsequent packet;
        determining a degree of congestion by:
            calculating a first difference between the first time stamp value and the third time stamp value;
            calculating a second difference between the second time stamp value and the fourth time stamp value; and
            calculating, based on the first difference and the second difference, a third difference; and
        controlling congestion in the network based on the degree of congestion.

12. The apparatus of claim 11, the method further comprising:
    appending a first timestamp to the first data packet prior to sending the first data packet to the destination device, wherein the first timestamp corresponds to a time at which the source device transmits the first data packet.

13. The apparatus of claim 11, the method further comprising:

including a first timestamp and a second timestamp in the first acknowledgement packet prior to sending the first acknowledgement packet.

14. The apparatus of claim 13, wherein the first timestamp is hardware generated at the source device and the second timestamp is hardware generated at the destination device.

15. The apparatus of claim 11, wherein controlling congestion in the network based on the degree of congestion comprises:
  in response to determining that the degree of congestion is low:
   incrementing a counter value Ci:
   increasing a packet transmission rate at the source device when the counter value Ci is above a threshold H; and
   increasing a packet transmission rate at the source device when the counter value Ci is below the threshold H and above a threshold F; and
  in response to determining that the degree of congestion is high:
   incrementing a counter value Cd;
   decreasing a packet transmission rate at the source device when the counter value Cd exceeds the threshold F; and
   decreasing a packet transmission rate at the source device when a timer at the source device has expired.

16. The apparatus of claim 11, wherein the source device sends data packets towards the destination device via a unidirectional protocol.

17. A non-transitory computer-readable storage medium storing instructions that when executed by a computer cause the computer to perform a method for controlling congestion in a network, the method comprising:
  sending, by a source device, a first data packet to a destination device;
  receiving, at the source device, a first acknowledgement packet from the destination device corresponding to the first data packet;
  extracting, from the first acknowledgement packet, a first pair of timestamp values which includes a first time stamp value generated by the source device when the source device sends the first data packet and a second timestamp value generated by the destination device when the destination device receives the first data packet;
  extracting, from a second acknowledgement packet corresponding to a subsequently transmitted packet to the destination device, a second pair of time stamp values which include a third time stamp value generated by the source device when the source device sends the subsequent packet and a fourth time stamp value generated by the destination device when the destination device receives the subsequent packet;
  determining a degree of congestion by:
   calculating a first difference between the first time stamp value and the third time stamp value;
   calculating a second difference between the second time stamp value and the fourth time stamp value; and
   calculating, based on the first difference and the second difference, a third difference; and
  controlling congestion in the network based on the degree of congestion.

18. The non-transitory computer-readable storage medium of claim 17, the method further comprising:
  appending the first timestamp to the first data packet prior to sending the first data packet to the destination device, wherein the first timestamp corresponds to a time at which the source device transmits the first data packet.

19. The non-transitory computer-readable storage medium of claim 17, the method further comprising:
  including the first timestamp and the second timestamp in the first acknowledgement packet prior to sending the first acknowledgement packet.

20. The non-transitory computer-readable storage medium of claim 17, wherein controlling congestion in the network based on the degree of congestion comprises:
  in response to determining that the degree of congestion is low:
   incrementing a counter value Ci;
   increasing a packet transmission rate at the source device when the counter value Ci is above a threshold H; and
   increasing a packet transmission rate at the source device when the counter value Ci is below the threshold H and above a threshold F; and
  in response to determining that the degree of congestion is high:
   incrementing a counter value Cd;
   decreasing a packet transmission rate at the source device when the counter value Cd exceeds the threshold F; and
   decreasing a packet transmission rate at the source device when a timer at the source device has expired.

21. The non-transitory computer-readable storage medium of claim 17, wherein the source device sends data packets towards the destination device via a unidirectional protocol.

* * * * *